D. FUNSTEN.

CINDER GUARD.

APPLICATION FILED OCT. 14, 1916.

Reissued Jan. 2, 1917.

14,240.

Inventor

David Funsten,

By Chas. J. Williamson

Attorney

THE NORRIS PETERS CO., PHOTO-LITHO., WASHINGTON, D. C.

UNITED STATES PATENT OFFICE.

DAVID FUNSTEN, OF WASHINGTON, DISTRICT OF COLUMBIA.

CINDER-GUARD.

14,240. Specification of Reissued Letters Patent. Reissued Jan. 2, 1917.

Original No. 1,171,033, dated February 8, 1916, Serial No. 55,090, filed October 9, 1915. Application for reissue filed October 14, 1916. Serial No. 125,741.

*To all whom it may concern:*

Be it known that I, DAVID FUNSTEN, a citizen of the United States, residing at Washington, District of Columbia, have invented certain new and useful Improvements in Cinder-Guards, of which the following is a specification.

It has long been the practice to place shields or guards at the sides of the windows of railway coaches as a protection against cinders and other small flying particles, and more recently a cinder guard has been devised which combines with the side shields, a top shield so as to form a hood surrounding three sides of the individual windows. The old form of guard, which employs a side shield alone, is good enough as far as it goes, but does not protect against cinders or small particles coming from above. The hood type, above referred to, was devised for the purpose of remedying this defect, but it also is faulty in that the top shields or guards are stationary, and are usually so high above the lower edge of the window sash that they do not effectively cut off cinders from above.

In carrying out my invention, I make use of side shields and also a shield to obstruct or cut off cinders coming from above, but differing from those heretofore employed in that the lateral shield, or the one designed to deflect the cinders from above, is movable up and down with the window sash, and preferably so extends outward from the lower cross-frame thereof that its outer edge will be as near the level of the bottom of the window sash, when raised, as possible without unduly obstructing the view. Such construction provides the most efficient arrangement for protection against cinders and the like in that the top or lateral shield is always as near the top of the actual opening of the window as it is possible to make it. Inasmuch as car window sashes are never raised more than half way up, a top shield of this kind is twice as effective, when the sash is thus raised, as one which extends permanently outward from a point above the top of the window.

Figure 1:
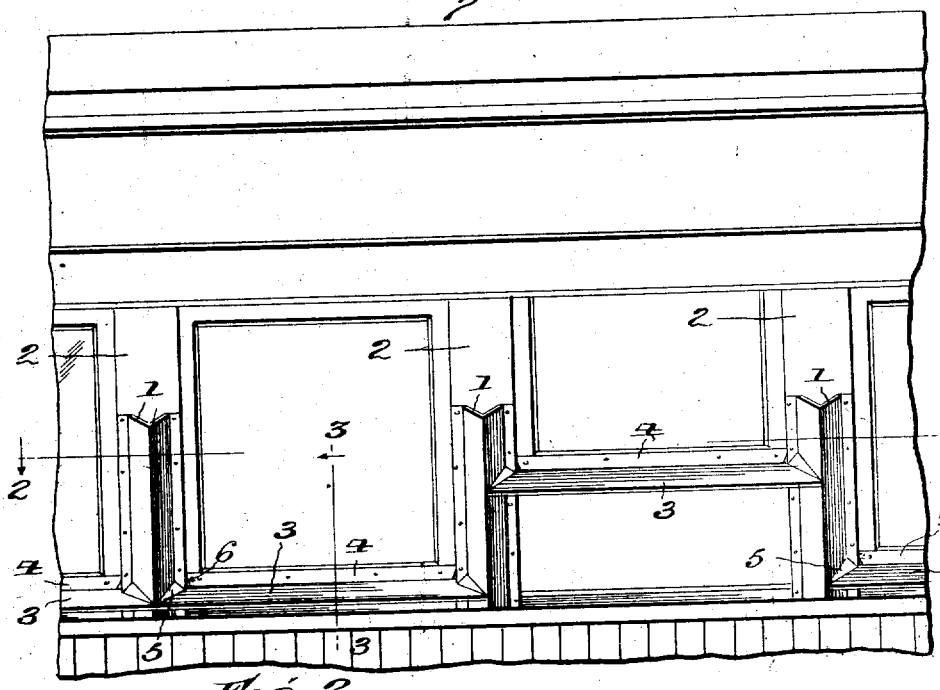
Figure 2:
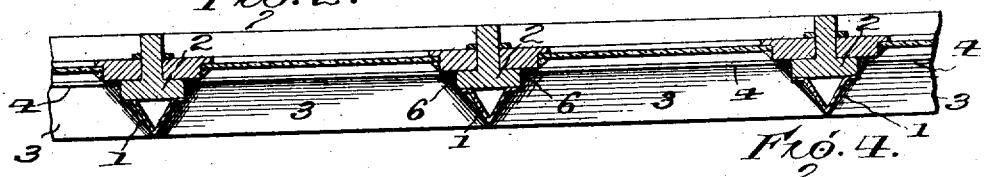
Figure 4:
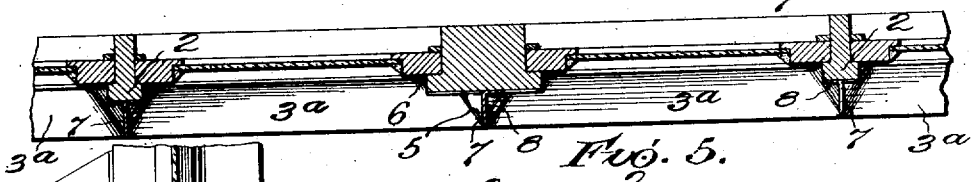
Figure 3:
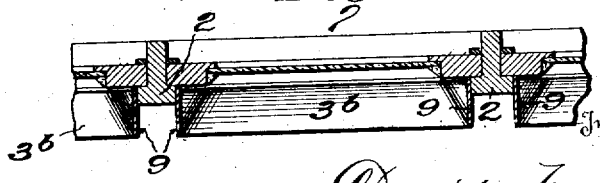

In order to more particularly describe my invention, reference will be had to the accompanying drawings wherein:

Figure 1 is a fragmentary side elevation of a railway coach equipped with cinder guards embodying one form of my invention; Fig. 2, a horizontal section along line $2^{\times}$—$2^{\times}$, Fig. 1; Fig. 3, an enlarged detail vertical section taken on line $3^{\times}$—$3^{\times}$, Fig. 1; Fig. 4, a fragmentary detail horizontal section of a modification of a form of my invention shown in the preceding figures, and, Fig. 5, a similar view of still another form of said invention.

My invention in the form shown in Figs. 1 to 3, inclusive, comprises, among other parts, side shields 1 fast respectively to the outside of the panels 2 between adjacent car windows. These shields in the form here shown are preferably of metal and V-shaped in cross section, with their apices extending outward from the car. This is an old form of side shield and nothing here is claimed new for this element in itself. My invention consists, in the form shown, in combining with these side shields intermediate or horizontal shields 3 made fast to the lower cross-frame of the window sash and adapted to travel up and down therewith between the side shields. In the form shown in Figs. 1 to 3, inclusive, these horizontal shields are provided each with a flange 4 extending at an angle therefrom and made fast in any desired way to the window sash, and the opposite edges of these shields are upturned as at 5 and 6 to deflect the cinders and dust, and prevent them from entering between end of the horizontal shield and the side shields. If desired, however, these upturned edges may be omitted.

The horizontal shields 3 make a sliding fit with the side shield 1, so that when the windows are raised and lowered, the horizontal shields will rise and fall therewith. It will therefore be seen that when a window is opened, as shown on the right Fig. 1, for example, the horizontal shield will be in a much more effective position to prevent the entrance of cinders into the window from above, than if this shield were located over the top of the window considered as a whole, and it obviously becomes more efficient in this respect in proportion to the lowering of the window sash.

In the form of my invention, shown in Fig. 4, the side shields are in the form of individual plates 7, which extend straight out from the sides of the car, and are provided with flanges 8 for attachment to the car panel. In this form of the invention, the horizontal shields $3^a$ are slightly different in contour to adapt them to the different form of side shield employed.

Figure 5:
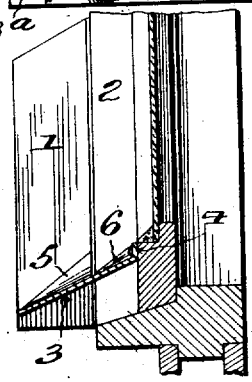

In the form of my invention shown in Fig. 5, the side shields are in the form of vertical plates 9 attached to the inner edges of the window panels. In this form of the invention, the horizontal shields $3^b$ are rectangular; that is have not the side wings or extensions which are necessary in the above described forms of the invention. By the attachment of the shield 3 wholly on the outside of the sash, neither sash nor sill where they come together requires to be changed from the ordinary window construction, as would be the case were the shield to be passed beneath the bottom edge of the sash.

I have herein shown and described only a few of the many forms which my invention may assume without departing from the spirit thereof.

What I claim is—

1. The combination with a car having a window provided with a vertically movable sash, of a cinder guard comprising a shield that extends substantially horizontally across and projects outwardly from the window substantially at the bottom of the sash.

2. The combination with a car having a window provided with a vertically movable sash, of a cinder guard comprising a shield that extends substantially horizontally across and projects outwardly from the window substantially at the bottom of the sash when the latter is in its fully raised position, said position being intermediate the sill and the top of the window.

3. The combination with a car having a window provided with a vertically movable sash, of a cinder guard comprising a substantially horizontally extending vertically movable shield that extends across the window and projects outwardly therefrom, said shield being shiftable to various vertical positions to agree with the various vertical positions of the sash bottom in the vertical movement of the sash.

4. The combination with a car having a window provided with a vertically movable sash, of a cinder guard comprising a substantially horizontal shield that extends across the window, and vertically movable to extend outwardly substantially at the bottom of the sash in all positions thereof.

5. The combination with a car having a window provided with a vertically movable sash, of a cinder guard comprising a substantially horizontally extending vertically movable shield that extends across the window, and having its outer free edge in substantially the plane of the bottom of the sash, said shield being shiftable to various vertical positions to agree with the various vertical positions of the sash bottom in the vertical movement of the sash.

6. The combination with a car having a window provided with a vertically movable sash, of a cinder guard comprising a substantially horizontally extending vertically movable shield that extends across the window, and having its outer free edge in substantially the plane of the bottom of the sash, and means attaching said shield to the sash situated wholly on the outside of the sash.

7. The combination with a car having a window provided with a vertically movable sash, of a cinder guard comprising a substantially horizontally extending vertically movable shield that extends across the window, said shield being shiftable to various vertical positions to agree with the various vertical positions of the sash bottom in the vertical movement of the sash, and a substantially vertical shield extending outward situated in a plane that crosses the plane in which the horizontally extending shield lies.

8. The combination with a car having a window provided with a vertically movable sash, of a cinder guard comprising a substantially horizontally extending vertically movable shield that extends across the window and having its outer edge in substantially the plane of the bottom of the sash, means attaching said shield to the sash situated wholly on the outside of the sash, and a substantially vertical shield extending outward situated in a plane that crosses the plane in which the horizontally extending shield lies.

9. The combination with a car having a window provided with a vertically movable sash, of a cinder guard comprising a horizontal shield extending across the window and outward therefrom and movable up and down by the window sash, and a substantially vertical shield extending outward from the side of the car in close proximity to an end of said lateral shield.

10. The combination with a car having windows provided with vertically movable sashes, of a cinder guard comprising a substantially vertical stationary shield located adjacent the side of a window and extending outward from the side of the car, and a horizontal shield secured to the bottom of the sash extending outwardly therefrom and adapted to be moved up and down by said sash in a path substantially parallel to said side shield and adjacent thereto.

11. The combination with a car having windows provided with vertically movable sashes, of a cinder guard comprising substantially vertical stationary shields located between adjacent windows and extending outward from the side of the car, and a horizontal shield secured to the window sash bottom, lying in a plane intersecting that of said vertical shields and movable up and down therebetween by the raising and lowering of said sash.

12. The combination with a car having a window provided with a vertically movable sash, of a cinder guard comprising a shield that extends substantially horizontally across and projects outwardly from the window, and a substantially vertical shield extending outward, said horizontally extending shield being upturned adjacent the vertical shield.

13. The combination with a car having a window provided with a vertically movable sash, of a cinder guard comprising a shield that extends substantially horizontally across and projects outwardly from the window substantially at the bottom of the sash, the said shield being provided with upward extensions at the sides of the window.

14. The combination with a car having a window provided with a vertically movable sash, of a cinder guard comprising a shield that extends substantially horizontally across and projects outwardly from the window substantially at the bottom of the sash, the said shield being provided with vertically extending flanges at its ends.

In testimony that I claim the foregoing I have hereunto set my hand.

DAVID FUNSTEN.

Copies of this patent may be obtained for five cents each, by addressing the "Commissioner of Patents, Washington, D. C."